(12) United States Patent
Krishnamurthy et al.

(10) Patent No.: US 6,975,990 B2
(45) Date of Patent: Dec. 13, 2005

(54) SEQUENTIAL-DATA SYNCHRONIZATION AT REAL-TIME ON AN ANALOG AND A DIGITAL MEDIUM

(75) Inventors: Sridhar Krishnamurthy, Chennai (IN); Selvaraj Murugaiyan, Maraimalai (IN)

(73) Assignee: Mudakara Global Solutions, Mylapore Chennai (IN)

( * ) Notice: Subject to any disclaimer, the term of this patent is extended or adjusted under 35 U.S.C. 154(b) by 804 days.

(21) Appl. No.: 09/752,528

(22) Filed: Jan. 3, 2001

(65) Prior Publication Data

US 2002/0087318 A1    Jul. 4, 2002

(51) Int. Cl.[7] .............................................. G10L 21/00
(52) U.S. Cl. ................. 704/270; 369/25.01; 369/29.02
(58) Field of Search ........................ 704/235; 369/25, 369/25.01, 29.02; 360/72.2

(56) References Cited

U.S. PATENT DOCUMENTS

| | | | | |
|---|---|---|---|---|
| 4,377,825 A | * | 3/1983 | Kasubuchi et al. | 360/48 |
| 4,663,678 A | * | 5/1987 | Blum | 360/72.2 |
| 4,968,254 A | * | 11/1990 | Gangwere et al. | 434/118 |
| 5,369,704 A | * | 11/1994 | Bennett et al. | 715/530 |
| 5,502,694 A | * | 3/1996 | Kwoh et al. | 369/25.01 |
| 5,737,725 A | * | 4/1998 | Case | 704/260 |
| 5,875,448 A | * | 2/1999 | Boys et al. | 715/531 |
| 6,002,558 A | * | 12/1999 | Rines et al. | 360/137 |
| 6,122,613 A | * | 9/2000 | Baker | 704/235 |
| 6,216,036 B1 | * | 4/2001 | Jenkins et al. | 607/27 |
| 6,282,510 B1 | * | 8/2001 | Bennett et al. | 704/235 |
| 6,535,848 B1 | * | 3/2003 | Ortega et al. | 704/235 |

* cited by examiner

*Primary Examiner*—W. R. Young
*Assistant Examiner*—Jakieda R Jackson
(74) *Attorney, Agent, or Firm*—Sughrue Mion, PLLC

(57) ABSTRACT

A method and device for synchronizing data between analog and digital mediums recorded either simultaneously from a single source or recorded from different sources, which requires synchronization. User-Data recorded in analog medium is referenced with out-of-band unique digital reference-data that is generated by the interface device to mark the position of the user data. The same reference-data communicated by the device and the user-data are stored in the digital medium also and a relationship is computed and established in the form of a table between the reference-data and the positions of the recorded user-data. Whenever there is a manipulation of the User-data on either of the mediums for the purpose of viewing, listening or editing, the Reference-data in that medium is interpreted by the device and the corresponding location of the user-data in the other medium is accessed by using the table. Manipulation to the user-data done, on either medium, any number of times is reflected on the user-data in the other medium. The objective of data synchronization stands achieved.

40 Claims, 4 Drawing Sheets

SEQUENTIAL-DATA SYNCHRONIZATION AT REAL-TIME ON AN ANALOG AND A DIGITAL MEDIUM

I. DESCRIPTION

I.A. Field

This disclosure generally relates to transcription. Specifically, devices and methods that embody improved techniques that can be generally used in applications, where a device is used to record audio information simultaneously with the generation of a computer file. The audio information is recorded as the computer file normally subjected to or further transcription. The disclosed technique is embodied in systems and methods for use in transcription.

I.B. Background

In the field of transcription, a person dictates information onto an audio recording apparatus. The apparatus records the audio information onto a recording medium. This recording medium is often a magnetic tape medium. While medical transcription is a most visible example, the techniques disclosed herein could be used in any application where an audio-recorded medium is used to perform further downstream activities like transcription.

After the audio information is recorded, the audio recorded material is transported to a location where human transcribers transcribe the recorded information. Conventionally, transcription was performed in-house, that is at a location physically close to the location where the actual dictation is performed. In some cases, it is imperative that the transcription be done locally. This is because, as in the case of a doctor dictating diagnostic information, the transcribed hard-copy reports are often required within a day or so. In such cases, the time taken for transporting the recorded audio materials have to be minimal.

The urgency is more severe in cases where the transcription activity can commence only after the person performing the dictation has completed the dictation. Often it is at the end of the person's workday. Therefore the recorded audio material can only be transported for transcription at the end of the workday.

Increasingly, the transcription is also performed remotely. In the case of remote transcription, the dictation (which has been recorded, for example, as audio tapes or in the form of computer files) is transported to a different location where transcription occurs. Using new technologies such as Internet, the dictation is recorded on a computer in the form of digital computer files (for example, Wave files) and then transported to the remote location via the Internet.

However, in such a case, dictating on to a computer necessitates a change in the method of working of the person performing the dictation, thereby presenting a difficulty. It further interferes with the thought process of dictation. It also relies exclusively on the computer as the back-up medium for the dictation. Conventionally, the back-up is created only at the end of a dictation and is a subsequent process.

Alternately, the dictation is performed on audio cassette tapes. These tapes are then re-played and recorded on the computer after the dictation is complete. In such a case, the obvious handicap is time, since the recording process has to essentially wait for the entire dictation to be completed. This method also involves manual intervention. In addition there is a loss in the quality of sound as the initial recording is done on an analog medium and then re-recorded on to a digital medium.

Conventional methodologies used widely for recording dictation involves dictating on to a tape recorder. The dictation itself is rarely in the form of a monologue and is mostly in the nature of a thought process that involves reviewing periodically. The review involves listening and editing over the dictation already delivered.

As noted above, the conventional technologies are beset with several problems at least including:

It takes a long time to create the computer files from audio recorded medium.

It is not easy to make changes in the audio recorded media

Any changes made on the audio recorded media will require recreating the computer audio files.

The thought process of the dictator is interrupted because of the required manual interventions in the dictation process.

Maintaining co-ordination between the audio recorded medium and the computer audio file is difficult.

II. SUMMARY OF THE DISCLOSED TECHNIQUES

To overcome the problems discussed above, an object of the disclosed techniques is to provide a dictator the capability to record on the recording medium while meeting all other needs by providing an interface between, for example a tape recorder and a computer that captures the dictation simultaneously. An added object is that there should be no changes in the general mode of working of the dictator. All the attendant corrections should be stored as computer audio files, ready to be transported via the web. A further object is to ensure a concurrent back up which is extremely critical as the very purpose of dictation would be defeated in case re-dictations are required.

To meet the objects described above, there is provided a method of capturing dictations for use in transcriptions. The method comprises dictating dictation information onto at least one recording medium that stores said dictation information in the form of recording medium data; simultaneously recording onto at least one computer audio file in the form of computer audio file data; and making changes to the recording medium data based on required corresponding changes in the dictation information, wherein said changes to the recording medium data are automatically reflected in the computer audio file data on a real time basis.

Preferably, said recording medium is a magnetic tape.

Preferably, said dictations comprise medical transcription information.

Preferably, said dictation information is spliced into time elements and a unique identifier each is associated with each of said time elements.

Still preferably, said recording medium comprises at least two channels, a first channel being used for storing said recording medium data and a second channel being used for storing said unique identifier.

Still preferably, said unique identifiers are generated by generating a train of pulses; feeding the pulses to a counter; feeding results of the counter to an encoding logic, wherein parallel data is converted to a serial data; outputting the serial data following start bits to form said unique identifier; amplifying and feeding the unique identifier to the second channel; and parallely feeding the serial data to a receiver-transmitter and communicating to a communications port of the computer.

Still preferably, each of switching function events on a device used to record in the recording medium generate a unique switching function event identifier each, said unique switching function event identifier being different from said unique identifiers corresponding to said time elements of information.

Still preferably, the method further comprises receiving the information from a sound port and inputting the information into the computer audio file in the form of digitized data; receiving the identifier data from the communications port; and maintaining a table which store said unique identifier data and corresponding locations in the computer audio file in a computer table file.

Still preferably, the computer is capable of interpreting the unique switching function identifiers and perform corresponding events in the computer to change the computer audio file and contents of the table stored in the computer table file appropriately.

Still preferably, said switching function events is one of record, play, rewind, fast forward, stop and save.

Still preferably, when a record function is encountered, the first channel receives the dictated information and the second channel receives the unique identifier data.

Still preferably, when a stop switching function event is encountered, the computer pauses inputting information into the computer file while the device pauses recording.

Still preferably, when the play function is encountered the first channel outputs the dictation information and the second channel outputs waveforms corresponding to the unique identifier.

Still preferably, when a rewind switching function is initiated, the computer suspends inputting dictation information into the computer audio file until further input is received from the communications port.

Still preferably, when an overwrite dictate is performed, the first channel receives overwrite dictation information and the second channel receives new unique identifiers.

Still preferably, the computer captures the new identifiers and replaces the corresponding contents of the table stored in the computer table file along with file locations corresponding to the overwritten dictation information.

Still preferably, the computer captures the unique identifiers and the dictation information from appropriate ports and appends the table stored in the computer table file and the computer audio file respectively.

Still preferably, the computer receives unique identifiers corresponding to the dictation information on the first channel and moves pointers in the computer table file to appropriate location to match the information output from the first channel.

Still preferably, after a dictation session is completed, a special function key is initiated corresponding to a save function and the computer interprets this save function to perform a save operation on the recorded computer audio file to a desired digital voice file format.

Still preferably, the unique identifier data recorded on the recording medium is converted to a digital pulse by a process comprising: detecting a transition from a 1 to 0 or a 0 to 1; creating a digital waveform based on results of said detecting; processing the digital wave form to remove start bits; feeding to a shift register driven by a same clock frequency used to generate data bits; and loading to the receiver-transmitter.

Another aspect of the disclosed technique is a system for performing dictations comprising at least one recording device that records dictation information on to a recording medium; at least one computer that creates a computer audio file that comprises said dictation information, wherein when changes are made to the information recorded in the recording medium, these changes are automatically reflected in the computer audio file on a real time basis.

Preferably, said recording medium is a magnetic tape.

Still preferably, said dictations comprise transcription information.

Still preferably, said dictation information is spliced into time elements and a unique identifier each is associated with each of said time elements.

Still preferably, said recording medium comprises at least two channels, a first channel being used for storing said recording medium data and a second channel being used for storing said unique identifier.

Still preferably, said system further comprises: a pulse generator for generating pulses; a counter that receives the pulses; an encoding logic that receives the results of the counter, said encoder logic converting parallel data to serial data to form unique identifier data; an amplifier to amplify and feed the serial data to the second channel; and a receiver-transmitter that parallely receives the serial data and communicates to a communications port of the computer.

Still preferably, each of switching function events on a device used to record in the recording medium generate a unique switching function event identifier each, said unique switching function event identifier being different from said unique identifiers corresponding to said time elements of information.

Still preferably, the computer further comprises: a dictation information receiver located in the computer for receiving the dictation information from a sound port and inputting the dictation information into the computer audio file in the form of digitized data; a identifier receiver that receives the unique identifier data from the communications port; and a table which comprises said unique identifiers and corresponding locations, said table being stored in a computer table file.

Still preferably, the computer is capable of interpreting the unique switching function identifiers and perform corresponding events in the computer to change the computer audio file and contents of the table stored in the computer table file appropriately.

Still preferably, said switching function events is one of record, play, rewind, fast forward, stop and save.

Still preferably, when a record function is encountered, the first channel is capable of receiving the dictated information and the second channel is capable of receiving the unique identifier data.

Still preferably, when a stop switching function event is encountered, the computer is capable of stopping inputting information into the computer audio file while the device pauses recording.

Still preferably, when the play function is encountered the first channel is capable of outputting the dictation information and the second channel is capable of outputting waveforms corresponding to the unique identifier.

Still preferably, when a rewind switching function is initiated, the computer is capable of suspending inputting dictation information into the computer audio file until further input is received from the communications port.

Still preferably, when an overwrite dictate is performed, the first channel is capable of receiving overwrite dictation information and the second channel is capable of receiving new unique identifiers.

Still preferably, the computer is capable of capturing the new identifiers and replacing the corresponding contents of the table stored in the computer table file along with file locations corresponding to the overwritten dictation information.

Still preferably, the computer is capable of capturing the unique identifiers and the dictation information from appropriate ports and capable of appending the table stored in the computer table file and the computer audio file respectively.

Still preferably, the computer is capable of receiving unique identifiers corresponding to the dictation information on the first channel and further capable of moving pointers in the computer table file to appropriate location to match the information output from the first channel.

Still preferably, after a dictation session is completed, a special function key is initiated corresponding to a save function and the computer is capable of interpreting this save function to perform a save operation on the recorded computer audio file to a desired digital voice file format.

Still preferably, the system further comprises: a transition detector that detects a transition from a 1 to 0 or a 0 to 1; a waveform generator that creates a digital waveform based on results generated by the detector; a shift register driven by a same clock frequency used to generate data bits that receives the digital waveform, and a receiver-transmitter that outputs data.

III. BRIEF DESCRIPTION OF THE DRAWINGS

The above objectives and advantages of the present invention will become more apparent by describing in detail preferred embodiments thereof with reference to the attached drawings in which.

IV. DETAILED DESCRIPTION OF THE PREFERRED EMBODIMENT

A preferred embodiment that embodies the methods and structure of the disclosed technique is presented herein. It should be noted that the device disclosed embodies both the structure and the methods disclosed herein. Due to the use of the disclosed techniques, at least the following advantages are observed:

The device accurately replicates the data on the recording magnetic medium onto a computer on a real time basis as and when the dictation/corrections are made.

The dictation is captured digitally at source giving better quality sound, which would improve the productivity of the transcriptionist.

The device enables dictation to be available as soon as each and every dictation is completed which has the effect of speeding up the turnaround time.

The device provides header information that would be relevant in identifying the source from which the dictation emanated and relevant particulars regarding the dictation such as the date, time and length of dictation.

The device stores the dictation in the form of audio files that can be transported via the web to any location to any destination.

It provides the dictator the flexibility of using a plurality of recording mediums for even a single dictation.

Figure 1:
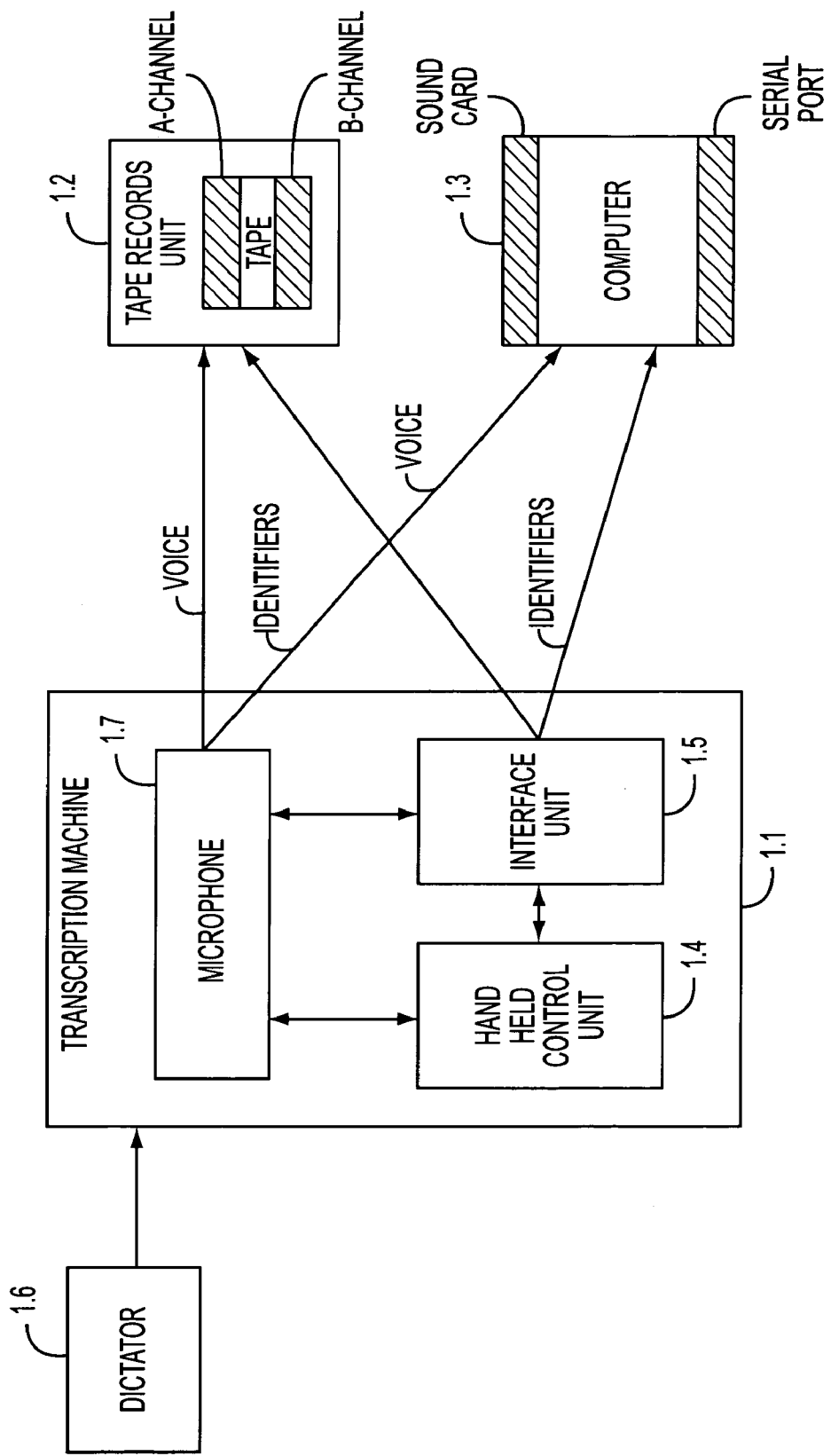
FIG. 1 shows a basic working model of a dictator dictating onto a tape machine.

FIG. 1 shows a basic working model of a dictator 1.6 dictating onto a transcription machine 1.1 where the simultaneous capture of his voice and the device used for synchronization are also shown. Here the dictator 1.6 dictates on to a microphone 1.7 which is connected to both the Tape recorder unit 1.2 and the Audio port of the computer 1.3. A Hand control unit 1.4, with its functions are shown. The functions of the hand control unit comprises generating identifiers and also feeding it to the computer and the tape. The Hand control unit is connected to the Tape recorder via the Interface unit 1.5 to tap the functions of the hand control unit to generate respective events to the computer.

Figure 2:
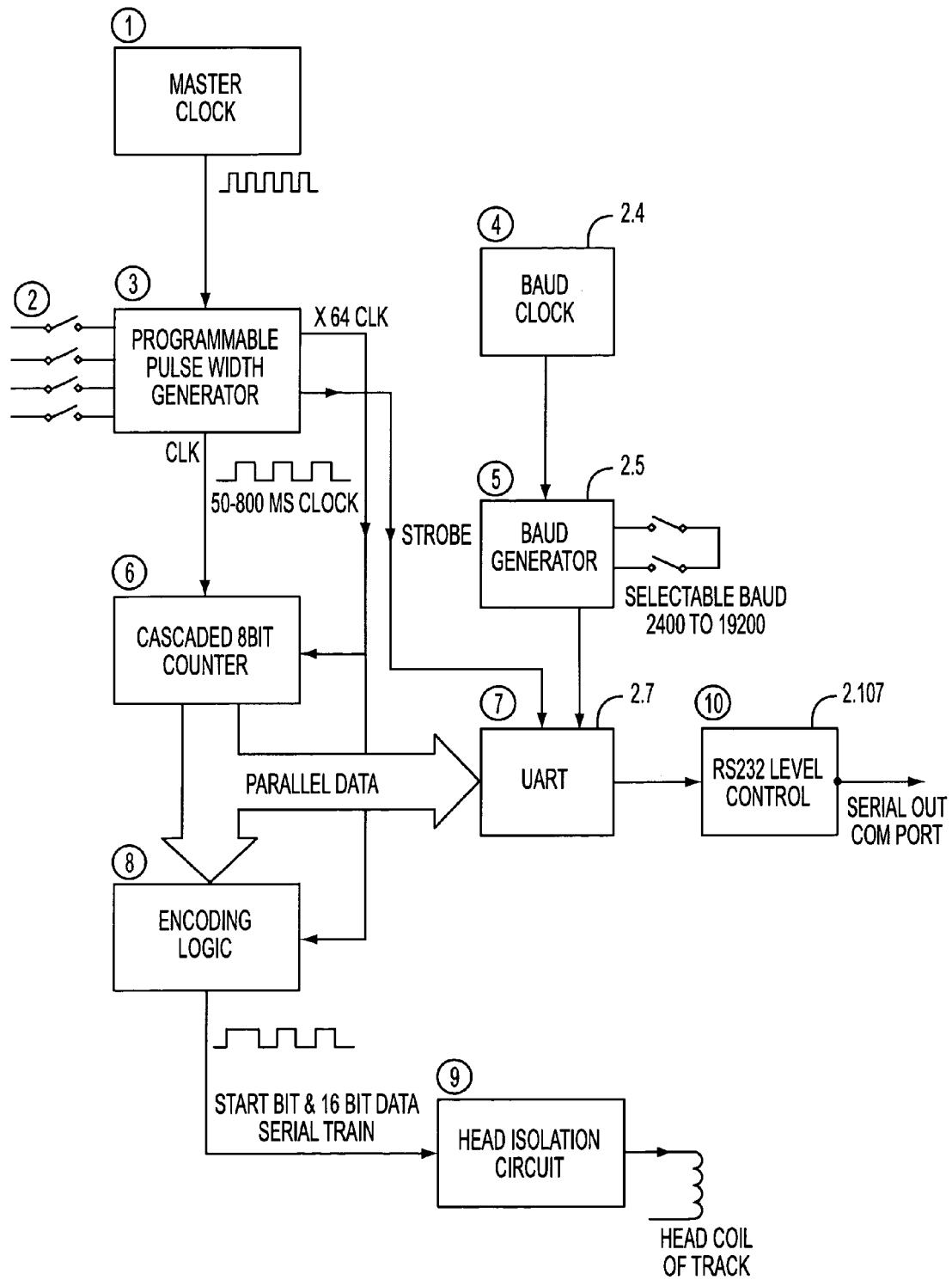
FIG. 2 depicts an illustration of the encoding logic.

FIG. 2 depicts an illustration of the encoding logic. In FIG. 2, the Master clock 2.1 and the Baud clock 2.4 provide the source frequency for the pulse generator and the baud generator respectively. The Pulse generator 2.3 can be programmed to output pulses of width 50 to 800 ms. This pulse generator also generates 64 times of the output pulse that are fed to the counters 2.6, shift registers and the encoding logic 2.8 to drive the data bits. The parallel output from the 8-bit cascaded counters 2.6 are also fed to the UART 2.7, which are converted into RS232 standards and fed to the RS232 level controller 2.10 as serial stream of two data bytes as Most significant and least significant bytes. In the Encoding logic 2.8 a start bit of two data bit length is generated and the parallel 16-bit data is converted into serial stream using shift registers and added to the Start bit. This is then outputted to the Head Isolation circuit 2.9 from where the data is written to the writing head of the Track-b.

Herein, the creation of identifier data is described. A programmable pulse width generator 2.3 is used to generate a train of pulses with varying pulse width from 50 ms to 800 ms and the width being selected using a 4-bit selector logic in increments of 50 ms. It is understood that though the pulse width used in the preferred embodiment is between 50 and 800 ms, any other pulse width could also be chosen according to the needs of a particular application. In this application, a 100 ms pulse width is selected. This train of pulses is fed to a cascaded 8-bit counter 2.6 where it counts the number of pulses generated and outputs a 16-bit parallel output, which is a result of the count. This parallel 16-bit count is then fed to an encoding logic 2.8 where a cascaded pair of 8-bit parallel-in serial-out shift registers convert the parallel data into serial pulse train.

This serial pulse train is outputted following a 2-bit length start-bit. This start bit is different from the one generated by the UART 2.7 for communication. However this start bit acts as an identification for the decoding circuit to denote that the signals that follow for the next 16 cycles corresponds to identifier data. The data that comes only after the start-bit is considered valid. This serial pulse train of 16 bit length along with the start bit is outputted after every pulse from the pulse generator. This signal is then amplified and fed to the writing head of the tape recorder through an isolation circuit 2.9. The signal is then transferred to the tape. Parallely the output from the counter 2.6 is fed to the UART 2.7, where the signal is converted with reference to communication port standards and fed to the signal level controller as a combination of two bytes namely the Most significant and the Least significant bytes to represent the 16-bit identifier data. In the RS232 level controller 2.10, the TTL signal is transformed to 12 v levels, which is ready to be transported over the wire to a communication port.

These serial pulse trains are representations of sequentially increasing decimal numbers from 1 to 65535, which represent identifiers. While the preferred embodiment uses a 16 bit identifier, the disclosed technique is not limited thereby. It should be clear that counters can be coupled together to make 32-bit representations or more. The actual resolution, represented by the size range of the identifiers, depends on the application. In addition, the nature of identifiers could be different based on the need of the application. Examples of different types of identifiers include patterns, bit streams etc. The identifiers are designed to be unique as they are required to identify every moment of the occurrence of the Audio data, corresponding to the dictation information, along the entire longitudinal length of the tape medium.

In a typical application the microphone is connected to the Audio-inputs of both the tape recorder and the sound card in the computer. The above mentioned track A and track B can be the two tracks in a stereo tape recorder. These tracks are typically used to record the left and right channels of the Audio information via a fixed Recording head. In a vocal dictation as used in medical transcription, the nature of the source itself is mono and stereo recording on both the channels is of negligible importance as they only contain identical information. Clearly, recording in any one channel itself ensures faithful reproduction of the dictation. This apparent redundancy is taken advantage of in the embodiment described herein.

The input from the microphone is fed to one of the tracks track A, via the fixed writing head corresponding to that track. In other applications where the analog writing medium includes more than one tracks or channels of recording, one track or channel would be necessarily created/allocated to store the Identifiers.

The output from the encoding logic after the isolation circuit 2.9 is connected to the writing head of Track B. The series of pulses that are representations of identifiers are written on to Track B. These identifiers are out of band identifiers of the Audio Data that is being recorded on Track A. The switching functions of the tape recorder such as Record, Rewind, Play, Forward and Pause are interpreted by the device. Any switching function on the tape recorder side generates a unique switching function event to be processed by the computer. This is made possible by making the switching function event identifiers unique. In the preferred embodiment, 65045 is used as a switching function event identifier for Record, 65077 for Rewind, 65061 for Play, 65109 for Forward, 65029 for Pause/stop and 65093 for Save. It is worth noting that the generation of the identifiers are looped at 65000 and goes back to 1 from then on. So a collision of identifier and switching function event identifier is theoretically impossible. Also in this environment, the max length of the commercially available tape is 45 minutes per side and generation of identifier even at highest resolution as 50 ms will need at most 27000 identifiers for them to be unique. However, a user can select the optimal range of identifiers to avoid collision and to satisfy a required resolution.

Figure 4:
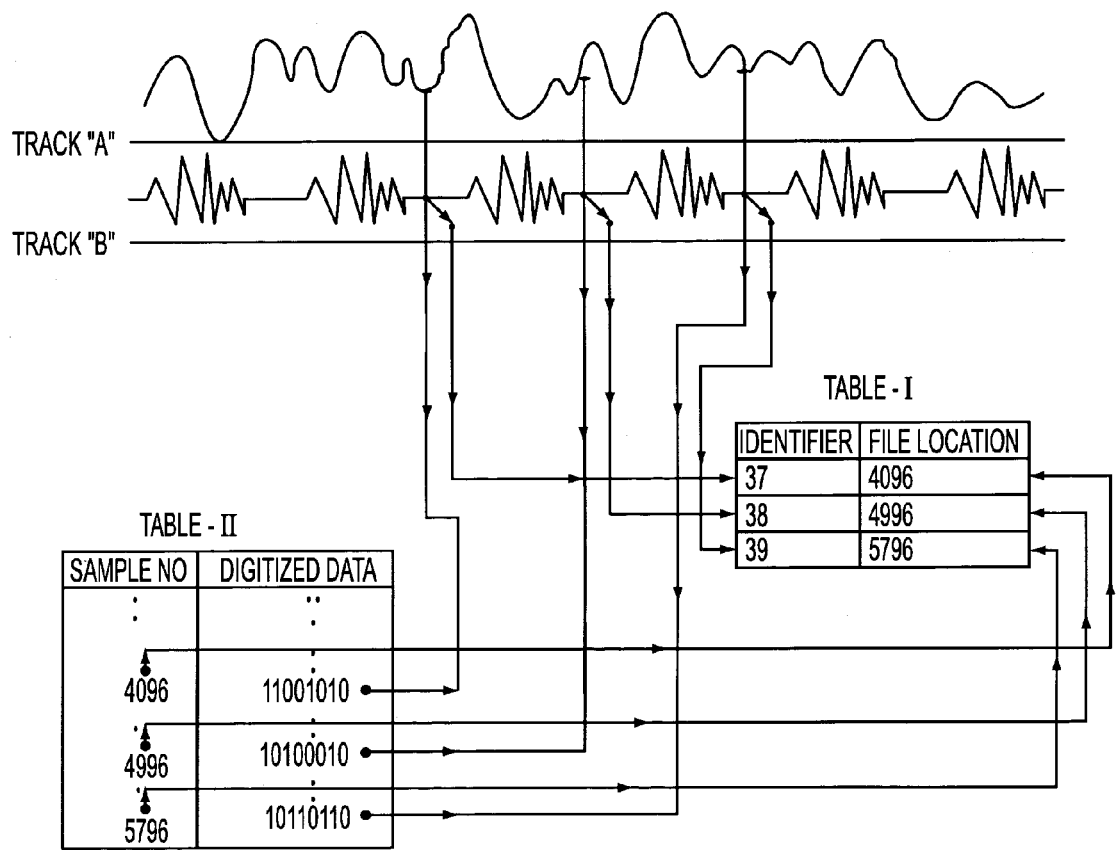
FIG. 4 shows a typical Audio tape medium.

FIG. 4 shows a typical Audio tape medium. As mentioned before, in track-A recording medium data corresponding to the transcription information is written and in Track-B the identifier data is written. In track-A audio data is written and in Track-B the identifiers are written. In table-I two fields as "Identifiers" and "File locations" are shown. For example when voice is captured and identifier 37 is written on to the tape, the identifier and the wave file position are also written on the table and the relation is shown. This relation is the moment of occurrence. In table-II the sequential filling and the organization of the wave file in the Hard disk is shown. It is understood that the current filling locator or the pointer can be moved anywhere within this file by specifying the location in terms of the samples.

A software application resides on the computer to record the Audio information from the sound port in a digitized Wave file format. This application is also capable of reading the two-byte information from the communication port and computes them into decimal identifiers. Further, this application maintains a table in a computer table file. This table comprises two fields named as "Identifiers" and "File locations". This application is capable of isolating the identifiers that are not part of reference data but representation of switching functions and is programmed to activate the corresponding switching functions on the wave file.

In table-I, as shown in FIG. 4, two fields as "Identifiers" and "File locations" are shown. For example when dictation information is captured and identifier 37 is written on to the tape, the identifier and the wave file position are also written on the table stored in the computer table file and the relation is shown. This relation is the moment of occurrence. In table-II, the sequential filling and the organization of the wave file in the Hard disk is shown. It is understood that the current filling locator or the pointer can be moved anywhere within this computer audio file by specifying the location in terms of the samples.

When the dictation is begun by pressing the Record button, the event is processed by the interface unit and the generation of identifiers begin. It is understood that the dictation also begins simultaneously. When the Audio information is written on to track-A, the serial pulse train representing the unique identifiers also gets written alongside on track-B. This marks the moment of occurrence of the Audio dictation information on track-A with the representation the corresponding identifier as a decimal number in track-B.

At the very moment the Record button is pressed the Interface unit generates a Record event or Identifier 65045. This is read by the resident software application as the commencement of the event "Record" and the software begins recording in the Audio wave file. After this moment as and when there is a identifier (other than those related to switching functions) in the port, the software converts the identifier into decimal number and updates the Identifier field of the table stored in the computer table file. At the same moment of arrival of the Identifier, the software also identifies the number of samples accumulated in the computer audio file, which in other words denotes the current position of the Recorded Audio file and appends it to the table, enabling it to create a database of positions corresponding to the identifiers.

When the Pause button is pressed, a Pause identifier or a 65029 is generated and both the tape recorder and the Software application pause their corresponding recording.

When Rewind button is pressed the tape begins rewinding, and a Rewind Identifier or 65077 generated by the device suspends the operations on the computer and the application waits for further input from the communication port.

Here it is worth noting that whenever a dictator rewinds or forwards the tape back or forth to a particular location for the purpose of reviewing and editing, it is but natural that he listens to the data in the tape to review and correct in the appropriate desired location. Hence the placement of the control function switch is positioned in such a way that whenever the Rewind or Forward is released it comes back to the Play mode automatically before the user intervenes to stop or take any further action.

When the Rewind switch is released the Tape recorder goes to the Play mode automatically. When the tape recorder is playing the Audio information recorded earlier, the Track-B information is also read by the head and passed to the preamplifier. This signal is then passed through the power amplifier to get a 5 v level waveform which is a representation of the recorded Identifier or a serial pulse.

Figure 3:
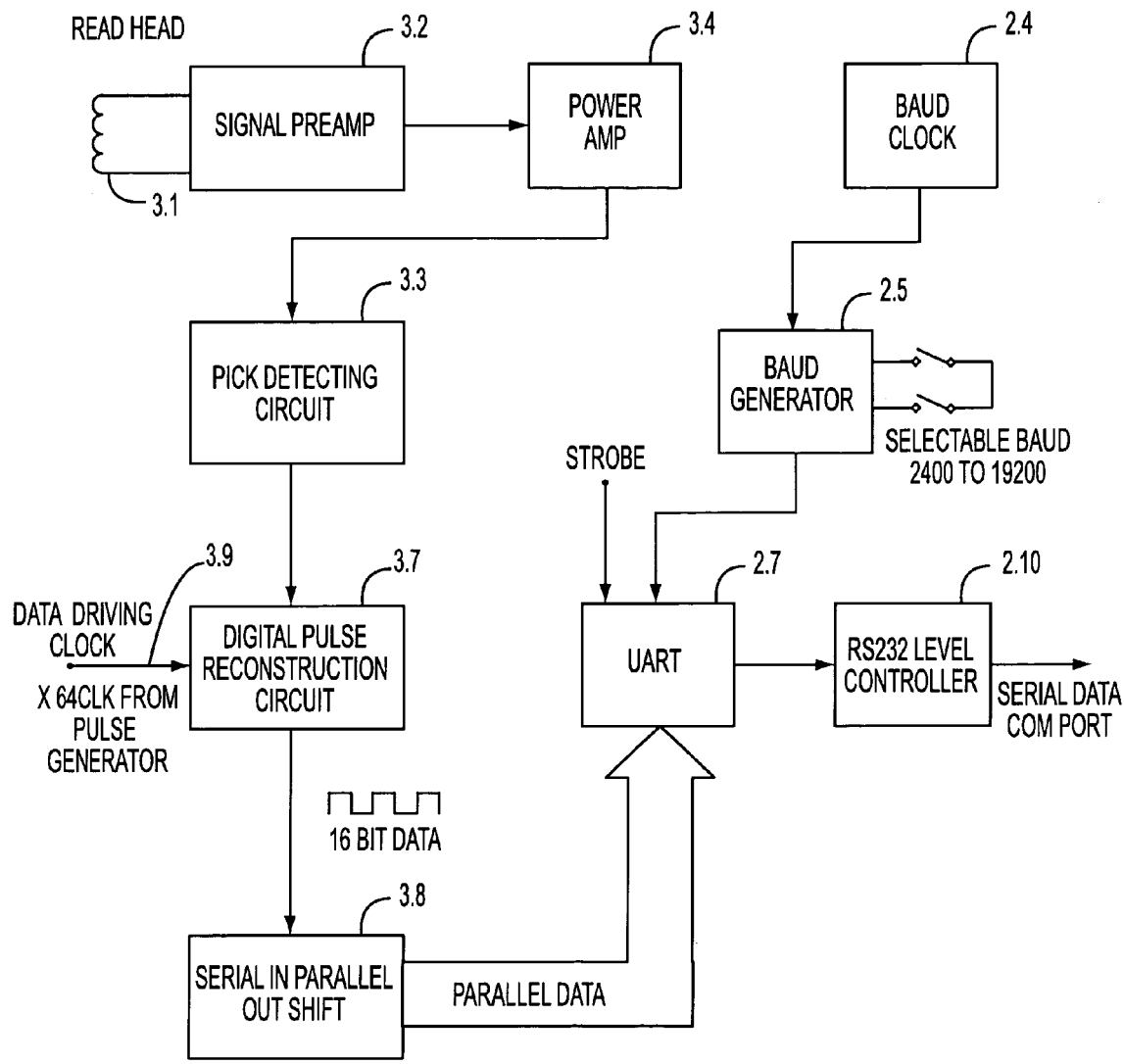
FIG. 3 depicts an illustration of the decoding logic.

FIG. 3 depicts an illustration of the decoding logic. It is assumed that there are two tracks in the recording medium. Of which, track-A corresponds to first channel in which recording medium data is stored. Track-B corresponds to the second channel in which the identifier data is written. In FIG. 3, the read head 3.1 corresponds to the track-B where the identifier data is written. When the tape is played the signal changes are sensed by this head and passed to the preamplifier 3.2, this signal is then passed on to the power amplifier 3.4 to get the required amplification of 5 v. The output analog wave form is a representation of the data written on to it. A peak detecting circuit 3.3 is used to detect the positive and negative peaks of that waveform. A threshold is set in a way that the peaks represent the raising edge and the falling edge of a digital "1". The data driving clock 3.9 which is 64 times of the pulse is used to drive the resultant waveform of this peak detecting circuit to construct an exact digital data of 16 bits. The timing of this is set in such a way to eliminate the first two bit which is a start-bit. This is then fed to a serial in parallel out cascaded shift register 3.8 to output two bytes of data that are the representations of the identifier written onto track-B of the tape. The UART 2.7 and the Level Controller 2.10 then communicates this data to the computer in a format corresponding to the Communication port.

The Analog waveform retrieved from the power amplifier 3.4 will have positively peaking transitions to represent the rising edge of the digital "1" and negatively peaking analog transitions to represent the falling edge of the digital "1" or start of a digital "0". Whenever there are no transitions in the digital data bit or whenever there is a series of multiple "1"s or "0"s, the analog waveform after showing the peak for the start of the transition, returns to zero and remains there unaltered until it sees any further transition on the digital waveform. So a peak detecting circuit in the interface device, which detects the start of any transition, either from 0 to 1 or from 1 to 0 is used and a digital waveform is reconstructed from the analog waveform retrieved from the tape medium.

This digital waveform is then processed to identify and remove the start bit and is fed to a shift register. After there is a first 8-bit shift driven by the same clock frequency used to generate the data bits, a strobe signal is given to load the 8 parallel bits to the input of the UART 2.7 via a data buffer. The UART gives this digital data bit to the communication port of the computer via a RS232 signal level controller. This 8-bit data represent the Most significant byte of the two byte data. A similar operation is performed to load the second 8-bit that represents the least significant of the 16-bit data.

The software application residing in the computer receives two bytes of this digital data and computes the decimal representation of those bytes. This decimal representation is the identifier which is recorded on to the tape along with the Audio information on another track. So this is basically the identifier of the moment of occurrence of that Audio data. As mentioned earlier this identifier was written onto a table stored in the computer table file along with the current play position of the Wave file. So the current play position is retrieved from the table with reference to the retrieved identifier. Now the current file position of the computer audio file is positioned according to the new value obtained from the table. The Audio dictation information in this position will be exactly in-sync with the audio being played by the tape recorder. As and when data identifier comes in to the communication port, the software application dynamically relocates its current play position accordingly and continues to be in-sync with the tape recorder.

When the user pauses or stops the tape recorder both the tape medium and the Wave file stops in an identical position with respect to the Audio information. Now, when a overwriting Dictate operation is performed, the Audio information on the track-A gets overwritten with new information. At the same time in the track-B the identifier gets overwritten with new identifiers. These new identifiers are communicated to the communication port and the software application captures these identifiers and the corresponding computer audio file locations (that are overwritten locations) and appends them onto the table.

When forward function is pressed the tape recorder moves forward and the Wave file remains in a paused state. Whenever the forward function is released, and when the tape is played, playing continues and the decoding of the identifiers continues and a synchronization is achieved between the Audio played from the tape and the Wave file in the computer as mentioned earlier in the Rewind and Play operations.

After a particular session of a dictation is over, a special function key is pressed. This function forwards the tape a little. This is to leave a small blank space between dictations for any identification later. At the same time this key is interpreted as a Save function and a function identifier 65091 is generated. This is read by the software application and a save command to the currently recorded file is issued. So a Wave file is saved in the computer which is an exact replication of the data recorded in the tape medium with any and all corrections made to the Audio data.

To track any possible error condition, or to track the history of all the operations performed related to the capture of the Audio file, a log file is maintained. This log file records all the Data and Function identifiers that were read by the communication port. By sequentially going through these identifiers any body could visualize the operations performed over a session.

While the current embodiment pertains to a single source and two mediums say analog and digital, the methodology adopted to ensure synchronization or correlation can be extended to a plurality of sources. In fact the source medium could be one or many and the destination mediums wherein the data needs to be correlated could also be one or many. The interval times selected as elaborated earlier could also vary based on the resolution required for the respective application. The interval times could be of any scale and the identifiers placed thereof could be of those moments. The identifiers can be patterns, bit streams or anything as long as they are unique and relevant to the characteristics of the recording medium.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of capturing dictations for use in transcriptions, said method comprising:
   a) dictating dictation information onto at least one analog recording medium that stores said dictation information in the form of recording medium data;
   b) simultaneously recording onto at least one computer audio file in the form of computer audio file data; and c) making changes to the recording medium data based on required corresponding changes in the dictation information wherein said changes to the recording medium data are automatically reflected in the computer audio file data on a real time basis.

2. The method of claim 1, wherein said recording medium is a magnetic tape.

3. The method of claim 1, wherein said dictations comprise transcription information.

4. The method of claim 1, wherein said dictation information is spliced into time elements and a unique identifier each is associated with each of said time elements.

5. The method of claim 4, wherein said recording medium comprises at least two channels, a first channel being used for storing said recording medium data and a second channel being used for storing said unique identifier.

6. The method of claim 5, wherein said unique identifiers are generated by:
   i) generating a train of pulses;
   ii) feeding the pulses to a counter;
   iii) feeding results of the counter to an encoding logic, wherein parallel data is converted to a serial data;
   iv) outputting the serial data following start bits to form said unique identifier;
   v) amplifying and feeding the unique identifier to the second channel; and
   vi) parallely feeding the serial data to a receiver-transmitter and communicating to a communications port of the computer.

7. The method of claim 4, wherein each of switching function events on a device used to record in the recording medium generate a unique switching function event identifier each, said unique switching function event identifier being different from said unique identifiers corresponding to said time elements of information.

8. The method of claim 6 further comprising:
   vii) receiving the information from a sound port and inputting the information into the computer audio file in the form of digitized data;
   viii) receiving the identifier data from the communications port; and
   ix) maintaining a table which store said unique identifier data and corresponding locations in the computer audio file in a computer table file.

9. The method of claim 7 wherein the computer is capable of interpreting the unique switching function identifiers and perform corresponding events in the computer to change the computer audio file and contents of the table stored in the computer table file appropriately.

10. The method of claim 7 wherein said switching function events is one of record, play, rewind, fast forward, stop and save.

11. The method of claim 10 wherein when a record function is encountered, the first channel receives the dictated information and the second channel receives the unique identifier data.

12. The method of claim 10 wherein when a stop switching function event is encountered, the computer pauses inputting information into the computer file while the device pauses recording.

13. The method of claim 10 wherein when the play function is encountered the first channel outputs the dictation information and the second channel outputs waveforms corresponding to the unique identifier.

14. The method of claim 10, wherein when a rewind switching function is initiated, the computer suspends inputting dictation information into the computer audio file until further input is received from the communications port.

15. The method of claim 10, when an overwrite dictate is performed, the first channel receives overwrite dictation information and the second channel receives new unique identifiers.

16. The method of claim 15, wherein the computer captures the new identifiers and replaces the corresponding contents of the table stored in the computer table file along with file locations corresponding to the overwritten dictation information.

17. The method of claim 11 wherein the computer captures the unique identifiers and the dictation information from appropriate ports and appends the table stored in the computer table file and the computer audio file respectively.

18. The method of claim 13 wherein the computer receives unique identifiers corresponding to the dictation information on the first channel and moves pointers in the computer table file to appropriate location to match the information output from the first channel.

19. The method of claim 10, wherein after a dictation session is completed, a special function key is initiated corresponding to a save function and the computer interprets this save function to perform a save operation on the recorded computer audio file to a desired digital voice file format.

20. The method of claim 6, wherein the unique identifier data recorded on the recording medium is converted to a digital pulse by a process comprising:
   detecting a transition from a 1 to 0 or a 0 to 1;
   creating a digital waveform based on results of said detecting;
   processing the digital wave form to remove start bits;
   feeding to a shift register driven by a same clock frequency used to generate data bits; and
   loading to the receiver-transmitter.

21. A system for performing dictations comprising:
   at least one recording device that records dictation information on to an analog recording medium;
   at least one computer that creates a computer audio file that comprises said dictation information,
   wherein when changes are made to the information recorded in the recording medium, these changes are automatically reflected in the computer audio file on a real time basis.

22. The system of claim 21, wherein said recording medium is a magnetic tape.

23. The system of claim 21, wherein said dictations comprise transcription information.

24. The system of claim 21, wherein said dictation information is spliced into time elements and a unique identifier each is associated with each of said time elements.

25. The system of claim 24, wherein said recording medium comprises at least two channels, a first channel being used for storing said recording medium data and a second channel being used for storing said unique identifier.

26. The system of claim 25, wherein said system further comprises:
   a pulse generator for generating pulses;
   a counter that receives the pulses;
   an encoding logic that receives the results of the counter, said encoder logic converting parallel data to serial data to form unique identifier data;
   an amplifier to amplify and feed the serial data to the second channel; and a receiver-transmitter that parallely receives the serial data and communicates to a communications port of the computer.

27. The system of claim 24, wherein each of switching function events on a device used to record in the recording medium generate a unique switching function event identifier each, said unique switching function event identifier being different from said unique identifiers corresponding to said time elements of information.

28. The system of claim 26 wherein the computer further comprises:
   a dictation information receiver located in the computer for receiving the dictation information from a sound port and inputting the dictation information into the computer audio file in the form of digitized data;
   a identifier receiver that receives the unique identifier data from the communications port; and
   a table which comprises said unique identifiers and corresponding locations, said table being stored in a computer table file.

29. The system of claim 27 wherein the computer is capable of interpreting the unique switching function identifiers and perform corresponding events in the computer to change the computer audio file and contents of the table stored in the computer table file appropriately.

30. The system of claim 27 wherein said switching function events is one of record, play, rewind, fast forward, stop and save.

31. The system of claim 30 wherein when a record function is encountered, the first channel is capable of receiving the dictated information and the second channel is capable of receiving the unique identifier data.

32. The system of claim 30 wherein when a stop switching function event is encountered, the computer is capable of stopping inputting information into the computer audio file while the device pauses recording.

33. The system of claim 30 wherein when the play function is encountered the first channel is capable of outputting the dictation information and the second channel is capable of outputting waveforms corresponding to the unique identifier.

34. The system of claim 30, wherein when a rewind switching function is initiated, the computer is capable of suspending inputting dictation information into the computer audio file until further input is received from the communications port.

35. The system of claim 30, when an overwrite dictate is performed, the first channel is capable of receiving overwrite dictation information and the second channel is capable of receiving new unique identifiers.

36. The system of claim 35, wherein the computer is capable of capturing the new identifiers and replacing the corresponding contents of the table stored in the computer table file along with file locations corresponding to the overwritten dictation information.

37. The system of claim 31 wherein the computer is capable of capturing the unique identifiers and the dictation information from appropriate ports and capable of appending the table stored in the computer table file and the computer audio file respectively.

38. The system of claim 33 wherein the computer is capable of receiving unique identifiers corresponding to the dictation information on the first channel and further capable of moving pointers in the computer table file to appropriate location to match the information output from the first channel.

39. The system of claim 30, wherein after a dictation session is completed, a special function key is initiated corresponding to a save function and the computer is capable of interpreting this save function to perform a save operation on the recorded computer audio file to a desired digital voice file format.

40. The system of claim 26, wherein the system further comprises:
   a transition detector that detects a transition from a 1 to 0 or a 0 to 1;
   a waveform generator that creates a digital waveform based on results generated by the detector; and
   a shift register driven by a same clock frequency used to generate data bits that receives the digital waveform,
   a receiver-transmitter that outputs data.

* * * * *